United States Patent [19]
Edwards

[11] Patent Number: 6,145,718
[45] Date of Patent: *Nov. 14, 2000

[54] ACCESSORY RACK FOR ALL TERRAIN VEHICLES

[76] Inventor: Jesse L. Edwards, 8400 S. 4000 West, No. 70, West Jordan, Utah 84088

[ * ] Notice: This patent issued on a continued prosecution application filed under 37 CFR 1.53(d), and is subject to the twenty year patent term provisions of 35 U.S.C. 154(a)(2).

[21] Appl. No.: 09/102,686

[22] Filed: Jun. 23, 1998

[51] Int. Cl.$^7$ .................................................. B60R 9/00
[52] U.S. Cl. .......................... 224/401; 224/537; 224/546; 224/553; 224/558; 224/571; 224/913
[58] Field of Search ..................... 224/400, 401, 224/419, 420, 421, 441, 442, 443, 445, 447, 448, 459, 460, 531, 532, 537, 514, 515, 319, 323, 545, 546, 547, 548, 552, 553, 555, 558, 567, 571, 913

[56] References Cited

U.S. PATENT DOCUMENTS

| | | | |
|---|---|---|---|
| 2,302,300 | 11/1942 | Davies | 224/571 X |
| 2,423,531 | 7/1947 | Theis | 224/268 X |
| 2,432,732 | 12/1947 | Del Cano | 224/537 X |
| 2,959,295 | 11/1960 | Howard et al. | 211/64 |
| 3,802,612 | 4/1974 | Smith | 224/571 X |
| 3,848,785 | 11/1974 | Bott | 224/319 |
| 4,247,030 | 1/1981 | Amacker | 224/401 |
| 4,682,720 | 7/1987 | Lucas | 224/311 |
| 4,728,019 | 3/1988 | Olliges | 224/323 X |
| 4,817,838 | 4/1989 | Kamaya | 224/323 X |
| 4,823,673 | 4/1989 | Downing | 224/401 X |
| 4,915,273 | 4/1990 | Allen | |
| 4,995,537 | 2/1991 | Thedieck | 224/273 |
| 5,078,279 | 1/1992 | Hancock | 211/64 |
| 5,222,753 | 6/1993 | Parish | 280/400 |
| 5,249,722 | 10/1993 | Horn | |
| 5,284,282 | 2/1994 | Mottino | 224/319 X |
| 5,316,192 | 5/1994 | Ng | 224/324 |
| 5,595,333 | 1/1997 | Boston | 224/536 |
| 5,697,181 | 12/1997 | Savant | 42/94 |
| 5,706,990 | 1/1998 | Lahrson | 224/410 |
| 5,779,120 | 7/1998 | Morford | 224/571 |
| 5,878,929 | 3/1999 | Leonard | 224/401 |

*Primary Examiner*—Gregory M. Vidovich
*Attorney, Agent, or Firm*—J. David Nelson

[57] ABSTRACT

The present invention is an apparatus for securing rifles, archery bows and other camping accessories to the cargo rack of an all terrain vehicle for transport. The apparatus consists of two support brackets which have a bracket pad of resilient material affixed in an opening in the brackets, a support structure for the support brackets and a means for securing the support structure to the cargo rack tubes of the all terrain vehicle. The support structure is comprised of two vertical support bars which are attached on the bottom to a horizontal bottom cross bar which is secured to the cargo rack. A horizontal top cross bar also connects the two support bars and provides added stability to the support bars. A stiffener plate which connects the bottom cross bar and the top cross bar can also be used to further enhance the stability of the support bars. The bottom cross bar is secured to the cargo rack tubes either by an anchor plate which is connected by bolts or other fasteners to the bottom cross bar which pinch the cargo rack tubes between the anchor plate and the bottom cross bar, or by anchor u-bolts which pinch the cargo rack tubes against the bottom cross bar.

4 Claims, 6 Drawing Sheets

Legend

| | | | | |
|---|---|---|---|---|
| 1 | Bottom Cross Bar | | | |
| 2 | Top Cross Bar | | | |
| 3 | Stiffener Plate | | | |
| 4 | Left Support Bar | | | |
| 5 | Right Support Bar | | | |
| 6 | ATV Cargo Rack Tube | | | |
| 7 | Anchor Bolt | | | |
| 8 | Bar Anchor Bolt Hole | | | |
| 9 | Anchor Nut | | | |
| 10 | Anchor Shim | | | |
| 11 | Anchor Shim Bolt Hole | | | |
| 12 | Anchor Plate | | | |
| 13 | Anchor Plate Bolt Hole | | | |
| 14 | Bottom Bar Adjustment Bolt Hole | | | |
| 15 | Bottom Bar Bolt | | | |
| 16 | Top Bar Adjustment Bolt Hole | | | |
| 17 | Top Bar Bolt | | | |
| 18 | Stiffener Plate Bolt Hole | | | |
| 19 | Stiffener Plate Bolt | | | |
| 20 | Bottom Bar End Cover | | | |
| 21 | Top Bar End Cover | | | |
| 22 | Right Support Bracket | | | |
| 23 | Left Support Bracket | | | |
| 24 | Bracket Pivot Bolt | | | |
| 25 | Pivot Bolt Nut | | | |
| 26 | Bracket Pivot Bolt Hole | | | |
| 27 | Support Pivot Bolt Hole | 31 | Position Bolt Nut | 42 | Bracket Plate |
| 28 | Bracket Position Bolt | 32 | Pinch Plate Bolt | 44 | Bracket Pinch Bolt Hole |
| 29 | Bracket Position Bolt Hole | 33 | Pinch Bolt Nut | 45 | Pad Pinch Bolt Hole |
| 30 | Support Position Bolt Hole | 34 | Pinch Plate | 51 | Top Support Bar Opening | 67 | Diameter of Cargo Rack Tube |
| | | 35 | Pinch Plate Bolt Hole | 52 | Btm. Support Bar Opening | 69 | Separation of Support Bars |
| | | 36 | Bracket Pad | 65 | Accessory Rack | 70 | Bottom Bar Stiffener Bolt Hole |
| | | | | 66 | Length of Anchor Shim | 71 | Top Bar Stiffener Bolt Hole |

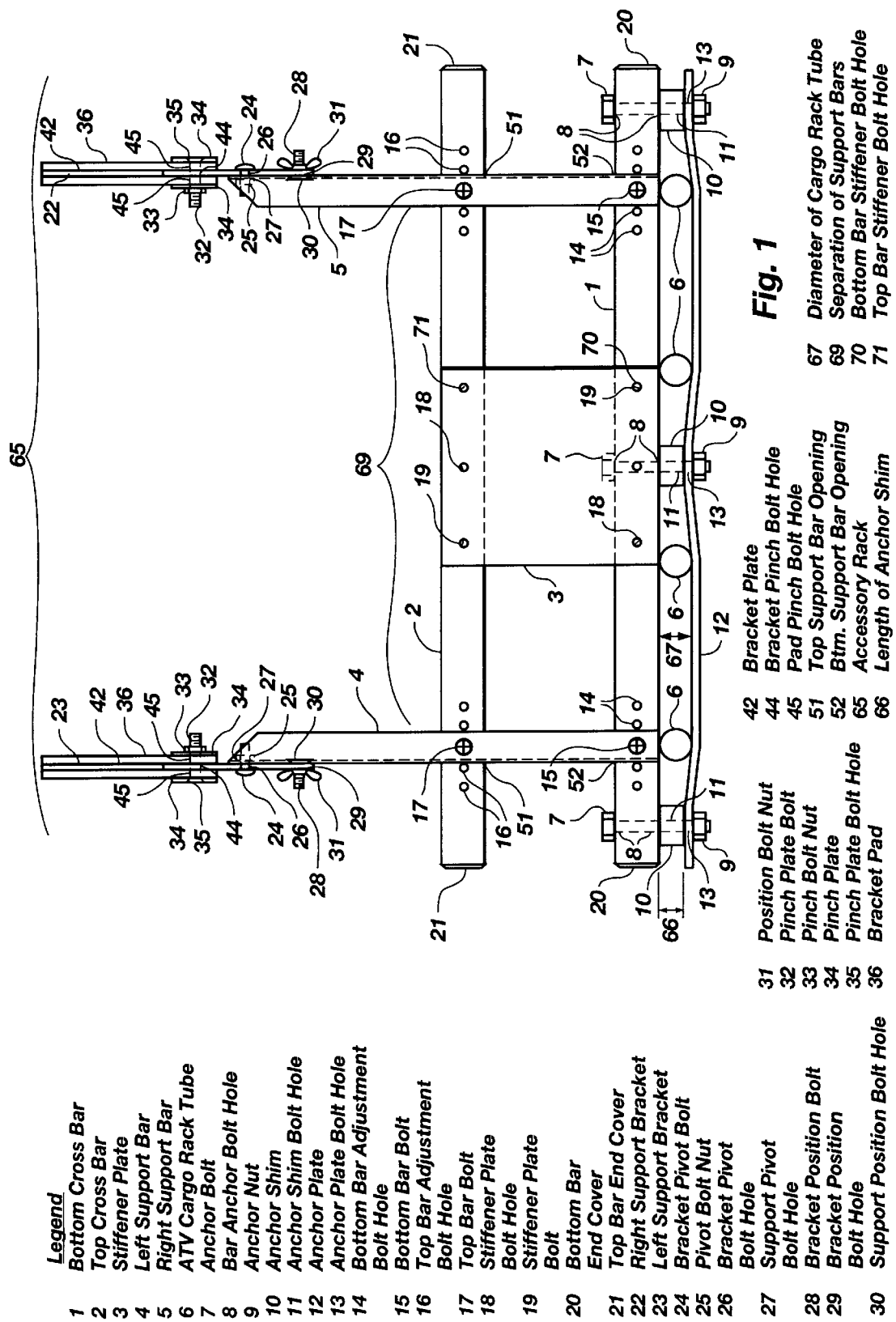

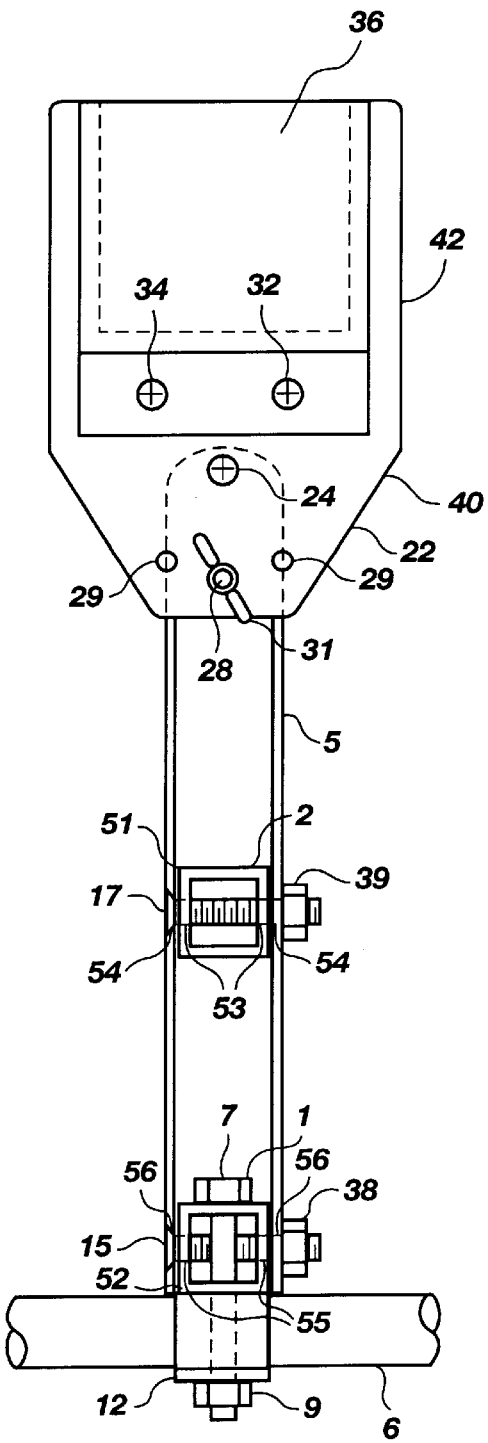

Legend

| | |
|---|---|
| 1 | Bottom Cross Bar |
| 2 | Top Cross Bar |
| 5 | Right Support Bar |
| 6 | ATV Cargo Rack Tube |
| 7 | Anchor Bolt |
| 9 | Anchor Nut |
| 12 | Anchor Plate |
| 15 | Bottom Bar Bolt |
| 17 | Top Bar Bolt |
| 22 | Right Support Bracket |
| 24 | Bracket Pivot Bolt |
| 28 | Bracket Position Bolt |
| 29 | Bracket Position Bolt Hole |
| 31 | Position Bolt Nut |
| 32 | Pinch Plate Bolt |
| 34 | Pinch Plate |
| 36 | Bracket Pad |
| 38 | Bottom Bar Bolt Nut |
| 39 | Top Bar Bolt Nut |
| 40 | Bracket Vertical Position |
| 42 | Bracket Plate |
| 51 | Top Support Bar Opening |
| 52 | Btm. Support Bar Opening |
| 53 | Top Bar Bolt Hole |
| 54 | Top Support Bar Bolt Hole |
| 55 | Bottom Bar Bolt Hole |
| 56 | Bottom Support Bar Bolt Hole |

*Fig. 2*

Legend
- 5 Right Support Bar
- 12 Anchor Plate
- 22 Right Support Bracket
- 24 Bracket Pivot Bolt
- 29 Bracket Position Bolt Hole
- 31 Position Bolt Nut
- 32 Pinch Plate Bolt
- 34 Pinch Plate
- 36 Bracket Pad
- 41 Bracket Rotated Position

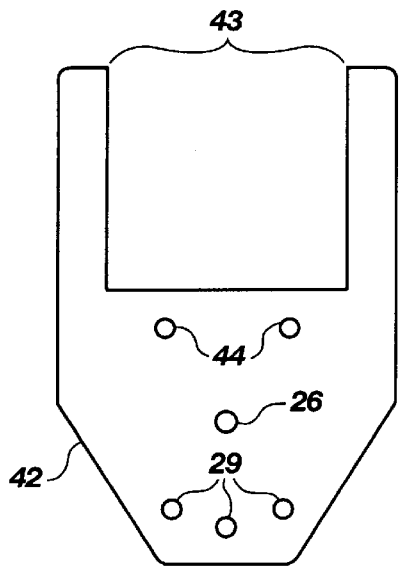

Fig. 4

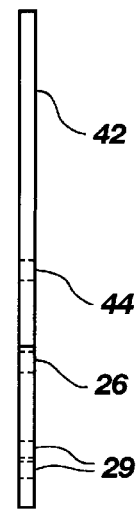

Fig. 5

Legend
26  Bracket Pivot Bolt Hole
29  Bracket Position Bolt Hole
42  Bracket Plate
43  Bracket Pad Slide Opening
44  Bracket Pinch Bolt Hole Legend
26  Bracket Pivot Bolt Hole
29  Bracket Position Bolt Hole
42  Bracket Plate
44  Bracket Pinch Bolt Hole

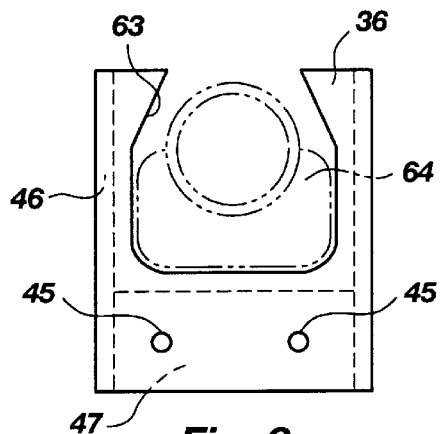

Fig. 6

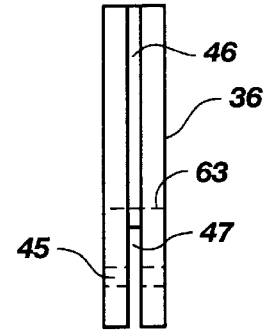

Fig. 7

Legend
36  Bracket Pad
45  Pad Pinch Bolt Hole
46  Pad Plate Slide Groove
47  Pad Pinch Groove
63  Accessory Pad Cut
64  Accessory Legend
36  Bracket Pad
45  Pad Pinch Bolt Hole
46  Pad Plate Slide Groove
47  Pad Pinch Groove
63  Accessory Pad Cut

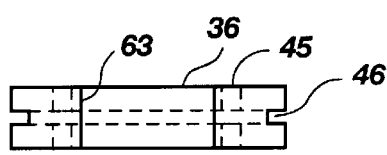

Legend
36  Bracket Pad
45  Pad Pinch Bolt Hole
46  Pad Plate Slide Groove
63  Accessory Pad Cut

Fig. 8

Legend
1 Bottom Cross Bar
2 Top Cross Bar
5 Right Support Bar
6 ATV Cargo Rack Tube
15 Bottom Bar Bolt
17 Top Bar Bolt
38 Bottom Bar Bolt Nut
39 Top Bar Bolt Nut
48 Anchor U-Bolt
49 Anchor U-Bolt Nut
50 U-Bolt Cover
57 U-Bolt Anchor Plate
58 U-Bolt Anchor Plate Hole
68 Ends of Anchor U-Bolts

Legend
59 Double Bracket Plate
60 Double Bracket Pad Slide Opening
61 Double Bracket Pinch Bolt Hole
62 Double Bracket Position Bolt Holes

ACCESSORY RACK FOR ALL TERRAIN VEHICLES

FIELD OF INVENTION

The present invention relates to apparatuses for securing hunting weapons and other hunting and camping accessories to vehicles and relates in particular to apparatuses for securing rifles, archery bows and other hunting and camping accessories to the cargo rack of all terrain vehicles.

BACKGROUND OF THE INVENTION

The use of all terrain vehicles for archery and rifle hunting has increased steadily since the introduction of the earliest all terrain vehicles. A number of apparatuses have been devised to secure archery bows and rifles to all terrain vehicles for transport.

U.S. Pat. No. 4,915,273 to Allen discloses a pair of brackets with spring loaded clamps which can be attached to the handle bars of a motorcycle or an ATV or can be attached to a mounting bar affixed to the handle bars or the cargo rack of an ATV or motorcycle.

U.S. Pat. No. 5,595,333 to Boston discloses a rack which attaches to the cargo rack of an ATV which has clamping and cradle arrangements for attaching an archery bow or a rifle, and provides a security mechanism for attaching other camping accessories.

U.S. Pat. No. 5,697,181 to Savant discloses a bracket for use on ATV's to allow adjustable attachment of gun racks used on all terrain vehicles.

U.S. Pat. No. 5,706,990 to Lahrson discloses a mount and attachment mechanism for attaching specially designed accessories to the cargo rack of an ATV.

While each of the devices disclosed in the prior art appears to have provided a means for achieving the apparent objectives for the device, none of the inventions disclosed in the prior art achieves several of the objectives of the present invention. Furthermore, the present invention provides improved capabilities for achieving a number of the objectives of the inventions disclosed in the prior art.

It is an objective of the present invention to provide a method and an apparatus for securing archery bows, guns, and other hunting, fishing and camping accessories to the cargo rack of an ATV.

Another objective of the present invention is to provide an ATV accessory rack that is light weight yet structurally sound to provide enhanced resistance to wear and deformation in normal use conditions.

Another objective of the present invention is to provide an ATV accessory rack which can be more easily and quickly attached and detached from an ATV cargo rack.

Another objective of the present invention is to provide an ATV accessory rack which is more securely attached to ATV cargo rack.

A further objective of the present invention is to provide an ATV accessory rack which allows more rapid insertion and removal of an archery bow, gun or other camping accessory.

Another objective of the present invention is to provide an ATV accessory rack which is more economical.

Another objective of the present invention is to provide an ATV accessory rack which can be readily and economically customized for each particular bow, gun or other camping accessory to be transported, thereby providing for secure attachment and support, with reduced movement and jostling of the accessory.

Another objective of the present invention is to provide an ATV accessory rack which provides for simultaneous transport of a plurality of archery bows, guns and other camping accessories.

SUMMARY OF INVENTION

The present invention is an apparatus for securing rifles, archery bows and other camping accessories to the cargo rack of an all terrain vehicle for transport. Preferred embodiments comprise two or more support brackets which have one or more bracket pads of resilient material affixed in openings in the brackets, a support structure for the support brackets and a means for securing the support structure to the cargo rack tubes of the all terrain vehicle. The support structure is comprised of two or more vertical support bars which are attached on the bottom to a horizontal bottom cross bar which is secured to the cargo rack. A horizontal top cross bar also connects the two support bars and provides added stability to the support bars. A stiffener plate which connects the bottom cross bar and the top cross bar can also be used to further enhance the stability of the support bars.

For certain preferred embodiments of the accessory rack, the bottom cross bar and the top cross bar are made of square tubing with a bottom bar end cover on each end. Aluminum or other lightweight material of adequate strength is preferred for these embodiments. Other types of tubing or bar stock can be used for the bottom cross bar and the top cross bar.

Some preferred embodiments of the present invention are secured to the cargo rack tubes of an all terrain vehicle by an anchor plate which is urged against the bottom of the cargo rack tubes by anchor bolts. Each of the anchor bolts extends from the top of a bottom cross bar through a bar anchor bolt hole in the bottom cross bar, a shim bolt hole in an anchor shim and a plate anchor bolt hole in the anchor plate. The length of the anchor shim is selected based upon the diameter of the cargo rack tubes to provide for the desired pinching effect of the anchor plate and the bottom cross bar on the cargo rack tubes as anchor nuts are tightened onto the anchor bolts.

An alternative means for securing the accessory rack comprises two or more anchor u-bolts which cradle the cargo rack tubes and the lower cross bar and the ends of the anchor u-bolts extend through u-bolt anchor plate holes in a u-bolt anchor plate which is positioned above the lower cross bar. Anchor u-bolt nuts are tightened onto the ends of the anchor u-bolts, thereby pinching the cargo rack tubes between each anchor u-bolt and the bottom of the bottom cross bar. A u-bolt cover, preferably of resilient material, aids the u-bolt in gripping the cargo rack tubes.

For embodiments utilizing two support bars, the bottom cross bar is attached to a left support bar and a right support bar. Under some of these embodiments, the left support bar and the right support bar are made of channel bar, with aluminum or other strong and lightweight material being preferred for those embodiments. Other types of structural units, such as square tubing, can also be used for the left and right support bars.

For certain preferred embodiments, the bottom cross bar and the top cross bar each pass through openings in the left support bar and the right support bar and are bolted to the support bars. The separation of the left support bar and the right support bar is adjusted by selecting adjustment bolt holes in the bottom cross bar and the top cross bar for insertion of these bolts which will result in the desired separation.

If a stiffener plate is used to provide additional stability to the structural support for the support brackets, the stiffener plate is connected to the top cross bar and the bottom cross bar by fasteners. Instead of a stiffener plate, other alternative means for providing additional stability to the accessory rack, such a diagonal cross bracing, may be used for other preferred embodiments.

For certain preferred embodiments, the support brackets are attached to the support bars by bracket pivot bolts and bracket position bolts. The position of the support brackets is adjusted as desired by selecting a bracket position bolt hole in each, alining it with a support position bolt hole in the attached support bar, inserting a bracket position bolt through the selected position bolt hole and the support position bolt hole.

For certain preferred embodiments the support brackets are comprised of a bracket plate with a bracket pad slide opening. A bracket pad of resilient material with pad plate slide grooves on each side and a pad pinch groove on the bottom is slid into place in the bracket pad slide opening. A pair of pinch plates which are secured to each bracket plate are tightened against the bracket pad securing the bracket pad in the bracket pad slide opening. Each bracket pad can be supplied pre-cut with an accessory pad cut or the user can make an accessory pad cut as needed to fit and cradle the accessory to be transported. The user can maintain a separate set of bracket pads with accessory cuts made to fit each of the accessories to be transported. The bracket pads can be exchanged by removing the pinch plates, exchanging the bracket pads, and replacing the pinch plates. Alternate bracket plates with two or more bracket pad slide openings may be used with certain preferred embodiments.

Other embodiments of the present invention may incorporate three or more support bars, each with an attached support bracket. Those embodiments may be used with particularly heavy or particularly flexible accessories to provide additional support and stability for the accessory. The additional support bars for those embodiments are attached to the bottom cross bar and the top cross bars in the same manner as for embodiments with two support bars.

BRIEF DESCRIPTION OF DRAWINGS

FIG. 1 is a front elevation of a preferred embodiment of the present invention.

FIG. 2 is a right side elevation of a support bar and support bracket of a preferred embodiment of the present invention with the support bracket in a vertical position.

FIG. 4 is a front elevation detail of a support bracket of a preferred embodiment of the present invention.

FIG. 5 is a side elevation detail of a support bracket of a preferred embodiment of the present invention.

FIG. 6 is a front elevation detail of a bracket pad of a preferred embodiment of the present invention with an accessory cut.

FIG. 7 is a side elevation detail of a bracket pad of a preferred embodiment of the present invention with an accessory cut.

FIG. 8 is a top view detail of a bracket pad of a preferred embodiment of the present invention with an accessory cut.

DETAILED DESCRIPTION OF PREFERRED EMBODIMENTS

Figure 3:
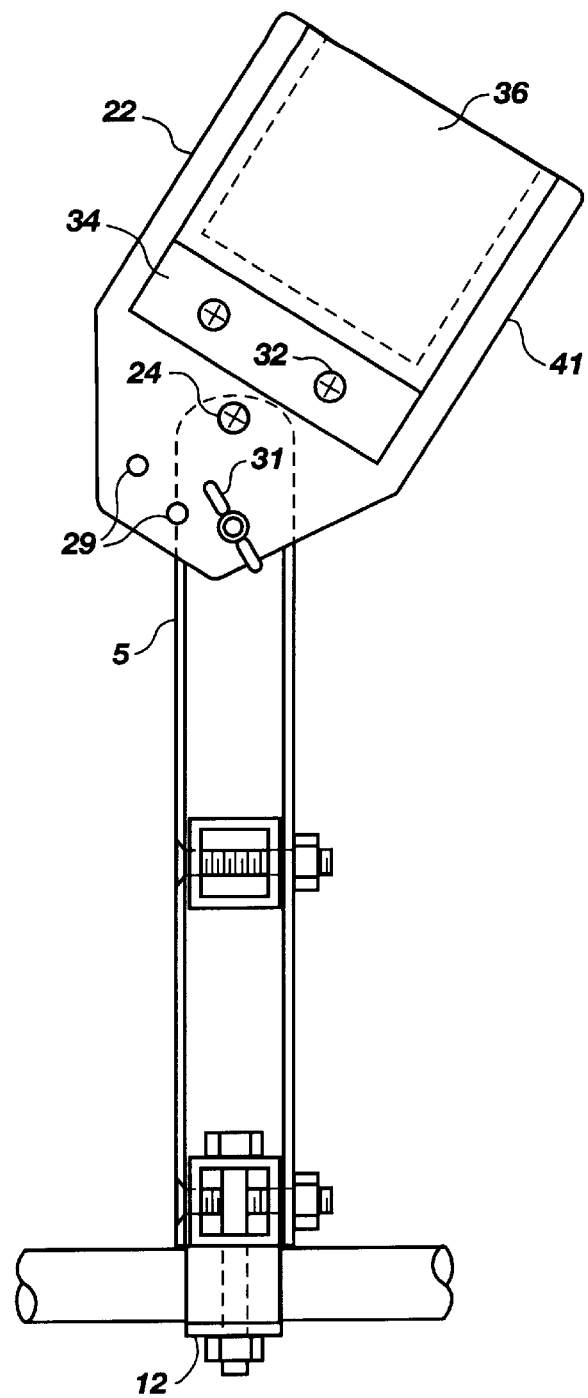
FIG. 3 is a right side elevation of a support bar and support bracket of a preferred embodiment of the present invention with the support bracket in a rotated position.

Referring first to FIG. 1, which is a front view of a preferred embodiment of the present invention looking from the rear of an all terrain vehicle (ATV), this embodiment of the accessory rack 65 is secured to the cargo rack tubes 6 of the all terrain vehicle by an anchor plate 12 which is urged against the bottom of the cargo rack tubes by three anchor bolts 7. Each of the anchor bolts extends from the top of a bottom cross bar 1 through a bar anchor bolt hole 8 in the bottom cross bar, a shim bolt hole 11 in an anchor shim 10, and a plate anchor bolt hole 13 in the anchor plate. The length 66 of the anchor shim is selected based upon the diameter 67 of the cargo rack tubes to provide for the desired pinching effect of the anchor plate and the bottom cross bar on the cargo rack tubes as anchor nuts 9 are tightened onto the anchor bolts. For certain preferred embodiments of the accessory rack, the bottom cross bar is made of square tubing with a bottom bar end cover 20 on each end. Aluminum or other lightweight material of adequate strength is preferred for these embodiments. Other types of tubing or bar stock can be used for the bottom cross bar.

Figure 9:
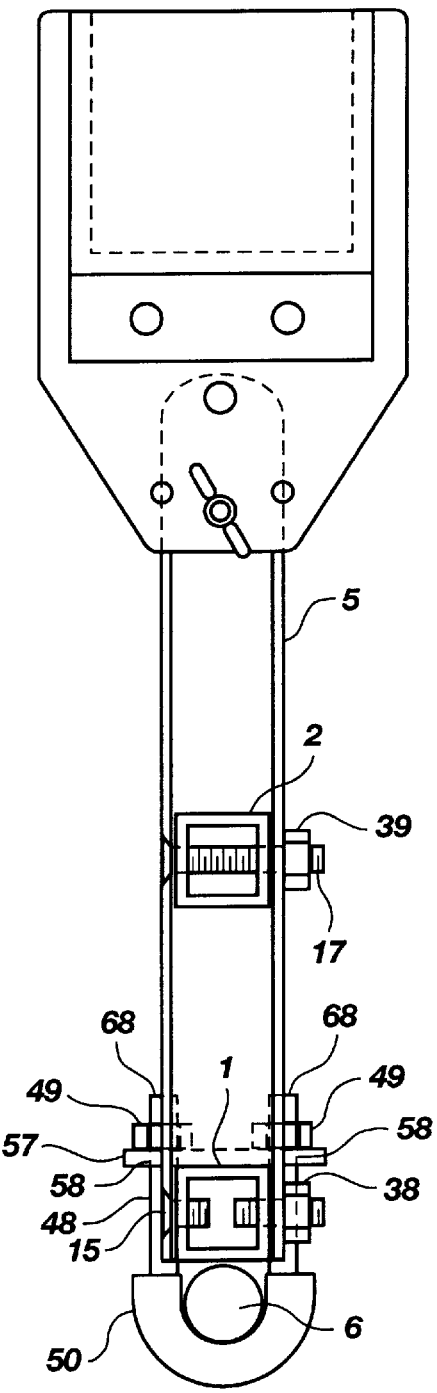
FIG. 9 is side elevation of a support bar of an alternative preferred embodiment of the present invention with an anchor U-bolt.

An alternative means for securing the accessory rack to the cargo rack tubes of an ATV is shown in FIG. 9. Two or more anchor u-bolts 48 cradle the cargo rack tubes 6 and the lower cross bar 1 and the ends 68 of the anchor u-bolts extend through u-bolt anchor plate holes 58 in a u-bolt anchor plate 57 which is positioned above the lower cross bar. Anchor u-bolt nuts 49 are tightened onto the ends of the anchor u-bolts, thereby pinching the cargo rack tubes between each anchor u-bolt and the bottom of the bottom cross bar. A u-bolt cover 50, preferably of resilient material, aids the u-bolt in gripping the cargo rack tubes.

Referring again to FIG. 1, the bottom cross bar is attached to a left support bar 4 and a right support bar 5 by bottom bar bolts 15. Under some preferred embodiments, the left support bar and the right support bar are made of channel bar, with aluminum or other strong and lightweight material being preferred for those embodiments. Other types of structural units, such as square tubing, can also be used for the left and right support bars.

For the preferred embodiment shown in FIG. 1, the bottom cross bar passes through a bottom support bar opening 52 in the left support bar and the right support bar. Referring to FIG. 2, each bottom bar bolt 15 passes through a bottom support bar bolt hole 56, bottom bar bolt holes 55 and another bottom support bar bolt hole 56. A bottom bar bolt nut 38 is tightened onto each bottom bar bolt, thereby securing the left and right support bars to the bottom cross bar.

Referring again to FIG. 1, a top cross bar 2 likewise passes through a top support bar opening 51 in the left support bar and the right support bar. Referring to FIG. 2, each top bar bolt 17 passes through a top support bar bolt hole 54, top bar bolt holes 53 and another top support bar bolt hole 54. A top bar bolt nut 39 is tightened onto each top bar bolt, thereby securing the left and right support bars to the top cross bar. Like the bottom cross bar, for certain preferred embodiments of the accessory rack, the top cross bar is made of square tubing with a top bar end cover 21 on each end. Aluminum or other lightweight material of adequate strength is preferred for these embodiments. Other types of tubing or bar stock can be used for the top cross bar.

Referring again to FIG. 1, the separation 69 of the left support bar and the right support bar is adjusted as desired by selecting the top bar adjustment bolt holes 16 and the bottom bar adjustment bolt holes 14 for insertion of the top bar bolts 17 and the bottom bar bolts 15 which will result in the desired separation.

Certain preferred embodiments also include a stiffener plate 3 which is attached to the top cross bar by the insertion of stiffener plate bolts 19 through stiffener plate holes 18 in the stiffener plate and through top bar stiffener bolt holes 71 and bottom bar stiffener bolt holes 70.

Instead of a stiffener plate, other alternative means for providing additional stability to the accessory rack, such a diagonal cross bracing, may be used for other preferred embodiments.

A right support bracket 22 is attached to the right support bar and a left support bracket 23 is attached to the left support bar by bracket pivot bolts 24, each of which passes through a bracket pivot bolt hole 26 and a support pivot bolt hole 27 and is secured in place by a pivot bolt nut 25. Referring also to FIG. 2 and FIG. 3, the position of the right support bracket and the left support bracket is adjusted as desired by selecting a bracket position bolt hole 29 in each, alining it with a support position bolt hole 30 in the attached support bar, inserting a bracket position bolt 28 through the selected position bolt hole and the support position bolt hole, and tightening a position bolt nut 31 onto the position bolt. A bracket vertical position 40 is shown in FIG. 2 and a bracket rotated position 41 is shown in FIG. 3. For certain preferred embodiments the position bolt nuts are wing nuts so that the position of the support brackets can be rapidly changed by hand without the use of tools.

Referring to FIG. 4 and FIG. 5, for certain preferred embodiments the right and left support brackets are comprised of a bracket plate 42 with a bracket pad slide opening 43. Referring now to FIGS. 6, 7 and 8, a bracket pad 36 of resilient material with pad plate slide grooves 46 on each side and a pad pinch groove 47 on the bottom is slid into place in the bracket pad slide opening. A pair of pinch plates 34 is secured to each bracket plate by a pair of pinch plate bolts 32 which pass through a pinch plate bolt hole 35, a pad pinch bolt hole 45, a bracket pinch bolt hole 44, another pad pinch bolt hole 45, and another pinch plate bolt hole 35, and are tightened against the bracket pad by tightening pinch bolt nuts 33. Each bracket pad can be supplied pre-cut with an accessory pad cut 63 as shown in FIG. 6 or the user can make an accessory pad cut as needed to fit and cradle the accessory 64 to be transported. The user can maintain a separate set of bracket pads with accessory cuts made to fit each of the accessories to be transported. The bracket pads can be exchanged by removing the pinch plates, exchanging the bracket pads, and replacing the pinch plates.

Figure 10:
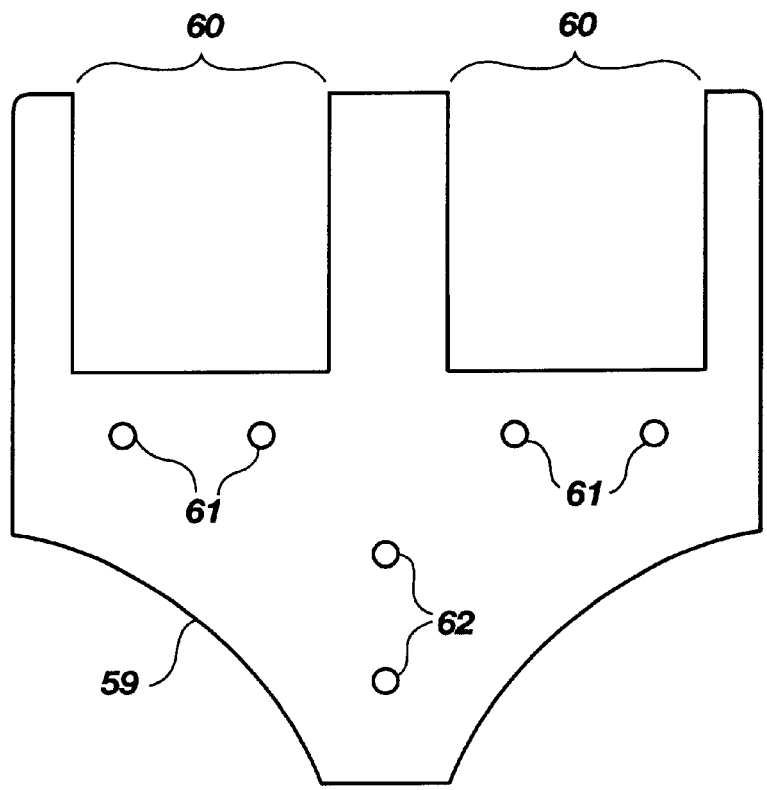
FIG. 10 is a front elevation detail of an alternative double support bracket of an alternative preferred embodiment of the present invention.

Referring to FIG. 10, an alternate double bracket plate 59 with double bracket pad slide openings 60 may be used with certain preferred embodiments. A bracket pad as shown in FIGS. 6, 7 and 8 is inserted in each of the bracket pad slide openings. Double bracket pinch bolt holes 61 provide for the use of a pair of pinch plates for each bracket pad in a manner similar to that shown in FIG. 2. For the double bracket plate shown in FIG. 10, double bracket position bolt holes 62 mate with the bracket pivot bolt 24 and the bracket position bolt 28 respectively shown in FIG. 2. The double bracket plate 59 shown in FIG. 10 can be exchanged for the bracket plate 42 shown in FIG. 2 by removing the bracket pivot bolt and the bracket position bolt. The double bracket plate provides for the simultaneous, secure transportation of two or more accessories. Similarly, support brackets which provide for three or more accessories by incorporating bracket plates with three or more bracket pad slide openings may be used for other embodiments. Those embodiments are particularly useful for transporting multiple smaller accessories such as fishing rods. For those embodiments the bracket plates may be attached to the support bars in a manner similar to that shown in FIG. 10 for a double bracket plate.

Other embodiments of the present invention may incorporate three or more support bars, each with an attached support bracket. Those embodiments may be used with particularly heavy or particularly flexible accessories to provide additional support and stability for the accessory. The additional support bars for those embodiments are attached to the bottom cross bar and the top cross bars in the manner shown in FIG. 1 and FIG. 2 for embodiments with two support bars.

Other types of structural members can be used for the bottom and top cross bars and for the left and right support bars of the accessory rack and other similar structural supports can be used for the support brackets which will be appreciated by persons skilled in the art. Similarly, other types of fasteners can be used to assemble the accessory rack which will be appreciated by persons skilled in the art.

Other embodiments and other variations and modifications of the embodiments described above will be obvious to a person skilled in the art. Therefore, the foregoing is intended to be merely illustrative of the invention and the invention is limited only by the following claims.

What is claimed is:

1. Apparatus for securing one or more hunting or camping accessories to a cargo rack of an all terrain vehicle to facilitate transporting the accessories, said apparatus comprising:

two or more support brackets;

one or more exchangeable bracket pads mounted with each said support bracket, each said bracket pad having an accessory pad cut to conform to the specific shape of the accessory and secure the accessory within said bracket pad, and each said bracket pad having a pad pinch groove in the bottom thereof whereby said support bracket slides into said pad pinch groove;

a pair of pinch plates attached to each said support bracket for securing each said bracket pad to said support bracket in which it is mounted;

support means for supporting said support brackets in a desired position; and attaching means for attaching said support means to the cargo rack.

2. Apparatus for securing one or more hunting or camping accessories to a cargo rack of an all terrain vehicle for transporting the accessories, said apparatus comprising:

two or more support brackets;

one or more exchangeable bracket pads mounted with each said support bracket, each said bracket pad having an accessory pad cut to conform to the specific shape of the accessory and secure the accessory within said bracket pad, and each said bracket pad having a pad pinch groove in the bottom thereof whereby said support bracket slides into said pad pinch groove;

a pair of pinch plates attached to each said support bracket for securing each said bracket pad to said support bracket in which it is mounted;

two or more support bars, each support bar being attached to and supporting a respective one of said support brackets; and attaching means for attaching said support bars to the cargo rack.

3. Apparatus for securing one or more hunting or camping accessories to cargo rack tubes of a cargo rack of an all terrain vehicle for transporting the accessories, said apparatus comprising:

two or more support brackets, each said support bracket having one or more bracket pad slide openings;

one or more exchangeable bracket pads mounted with each said support bracket, each said bracket pad having an accessory pad cut to conform to the specific shape of the accessory and secure the accessory within said bracket pad;

a pair of pinch plates attached to each said support bracket for securing each said bracket pad to said support bracket in which it is mounted;

two support bars, each said support bar being attached to and supporting a respective one of said support brackets in a desired position;

a bottom cross bar attached to each support bar, stabilizing said support bars in a desired position; and an anchor plate connected to said bottom cross bar, for pinching the cargo rack tubes between said bottom cross bar and said anchor plate, said anchor plate accommodating cargo racks of varying configurations and providing for selective positioning of said apparatus on the cargo rack.

4. Apparatus as recited in claim 3, wherein each said bracket pad includes a pad pinch groove in the bottom thereof, and wherein said support bracket slides into said pad pinch groove.

* * * * *